United States Patent [19]
Kovacich et al.

[11] Patent Number: 5,186,055
[45] Date of Patent: Feb. 16, 1993

[54] HERMETIC MOUNTING SYSTEM FOR A PRESSURE TRANSDUCER

[75] Inventors: John A. Kovacich, Wauwatosa, Wis.; Christopher C. Hoinsky, Huntington, Conn.; Donald G. Williams, Sherman, Conn.; Robert A. Schiesser, Ridgefield, Conn.

[73] Assignee: Eaton Corporation, Cleveland, Ohio

[21] Appl. No.: 709,551

[22] Filed: Jun. 3, 1991

[51] Int. Cl.$^5$ .............................. G01L 7/08; G01L 9/06
[52] U.S. Cl. ..................................... 73/727; 29/621.1; 73/724; 73/726; 73/756; 338/4; 361/283
[58] Field of Search .................. 73/720, 721, 726, 727, 73/753, 754, 756, DIG. 4, 718, 724; 338/4, 42; 361/283; 29/621.1

[56] References Cited
U.S. PATENT DOCUMENTS

| | | | |
|---|---|---|---|
| 4,127,840 | 11/1978 | House | 338/4 |
| 4,771,639 | 9/1988 | Saigusa et al. | 73/727 |
| 4,898,035 | 2/1990 | Yajima et al. | 73/727 |
| 4,918,992 | 4/1990 | Mathias | 338/4 |
| 4,972,716 | 11/1990 | Tobita et al. | 73/721 |

Primary Examiner—Donald O. Woodiel
Attorney, Agent, or Firm—L. H. Uthoff, Jr.

[57] ABSTRACT

A pressure transducer (50) of the type utilizing a diaphragm (8) with strain sensitive elements (14) formed in the diaphragm surface where the strain sensitive elements (14) are connected to an electronics assembly (4) to produce an electrical output in response to deflection of the diaphragm (8). A diaphragm assembly (26) is bonded to an intermediate support member (28) which is in turn bonded to a main support member (32) which is joined to a support collar (42) and hermetically sealed thereto with a sealing glass (40) where each element (2, 28, 32, 42) has a substantially matched coefficient of thermal expansion so as to reduce any induced thermal stresses and resultant measurement errors where the sealing glass (40) and the support collar (42) have a greater coefficient to produce a compressive type seal at high temperature. A pressure fitting (58) is joined to the external fluid pressure to be measured where the fluid is conducted to the diaphragm (8) through a plurality of passageways (30, 34, 56) in the support elements (28, 32, 44). A main housing (48) encloses the pressure sensing assembly (2) and support members (28, 32, 42) thereby providing protection from the environment.

32 Claims, 6 Drawing Sheets

HERMETIC MOUNTING SYSTEM FOR A PRESSURE TRANSDUCER

BACKGROUND OF THE INVENTION

The present invention relates to pressure sensing transducers of the type utilizing strain sensitive elements formed in a flexible diaphragm subjected to a pressure to be measured. More particularly, the present invention relates to an improved pressure sensing assembly mounting arrangement with a hermetic seal of the high pressure chamber for reduced component stress, media compatibility, improved stability and improved measurement accuracy at elevated temperature.

Semiconductor pressure transducers have a wide range of applications including industrial and other applications where accurate pressure monitoring is required especially under harsh environments. Semiconductor pressure transducers utilizing silicon, sapphire or other crystalline diaphragms offer many potential advantages in such applications due to their small size, absence of moving parts and potential for sensitivity and accuracy.

The typical semiconductor pressure transducer basically consists of a pressure force collector diaphragm having one or more electrical strain sensitive elements such as piezoresistors or a capacitor mounted thereon which change electrical characteristics with the deflection of the diaphragm where such changes are detected, amplified and relayed to various instrumentation which indicates the pressure history of the monitored system.

In one prior art approach, dopant silicon piezoresistive elements are formed directly in a force collector diaphragm of single crystal silicon. Since the silicon piezoresistive film is integral to the silicon diaphragm, the piezoresistive film is essentially an atomic extension of the diaphragm and has the same crystal structure. This results in improved bonding and effectively no hysteresis effect. Additionally, the piezoresistive elements may be formed in specific orientations according to the needs of the particular transducer. Specifically, a Wheatstone bridge configuration of silicon piezoresistive elements may be laid out on the diaphragm using techniques well known in the art such as doping, masking and etching.

Although having many advantages, such silicon transducers also have inherent disadvantages as well, particularly at elevated temperatures. Since the silicon diaphragm is a semiconductor by nature, electrical leakage between the piezoresistive elements through the silicon diaphragm may occur at high temperatures. Each silicon piezoresistive element is typically formed in an island of oppositely doped conductivity type, where the P-N junction prevents current flow from the piezoresistive film into the diaphragm. However, at higher temperatures, typically those above 350° F., the P-N junction typically experiences complete failure and/or undesirable electrical characteristics.

In order to overcome the problem of the breakdown of the P-N junction at high temperature between the piezoresistive elements and the diaphragm two approaches have been used. In the first, a sapphire material has been used as a diaphragm. This technique is described in U.S. Pat. No. 4,994,781 the disclosure of which is incorporated herein by reference. Since sapphire is an electrical insulator, there is no need for a reversed biased semiconductor junction between the piezoresistive element and the diaphragm. However, differences in the coefficient of the expansion of the different materials that are used in the piezoresistive elements, the force diaphragm, the support element, and the transducer housing can still combine to induce stress related failures in one or any of the parts especially at elevated temperature.

A second approach is to use a diaphragm assembly configuration referred to in the art as silicon-on-insulator. In this method, an insulating oxide layer is created between two layers of single crystal silicon. One of the layers of silicon is very thin while a second layer is relatively thick. The pressure sensitive diaphragm is formed in the thicker silicon layer while a plurality of strain gages are formed in the thinner layer using techniques well known in the art such as doping, masking or etching. The rest of this thin silicon layer is etched away, leaving the strain gages as dielectrically isolated islands on a silicon diaphragm.

To utilize silicon or sapphire diaphragms in pressure transducers, it is necessary to suitably mount the diaphragm in a housing adapted to be connected to a source of pressure to be measured. For many industrial and aerospace applications, the media, pressures and temperatures are so extreme that a rugged mounting and sealing arrangement for the pressure sensing diaphragm is required and heretofore has not been available.

In order to achieve adequate strength, the diaphragm is commonly mounted on a support structure. If the thermal expansion coefficients of the support are substantially different than the diaphragm assembly, temperature variations can cause stresses and strains to be produced in the diaphragm and support structure giving rise to stress induced failure and measurement error. This error arises because thermal stresses produced in the diaphragm cause changes in the electrical properties of the diaphragm strain sensing elements which are indistinguishable from those changes caused by pressure induced bending strain in the diaphragm. Selecting a support material that has a coefficient of thermal expansion that matches that of the diaphragm to minimize thermally induced stress is a solution to this problem and is known in the prior art. The problem with the prior art is specifically with hermetically sealing the diaphragm support to the housing for use at high temperatures and pressures.

One method to seal the diaphragm support element in a pressure transducer is disclosed in U.S. Pat. No. 3,697,917, the disclosure of which is incorporated by reference, which employs an elastomer to seal the pressure to be measured from the ambient pressure across the diaphragm. Elastomers do not function well at high temperatures and pressures. In addition, they may pose problems of compatibility for some media.

Another sealing method is disclosed in U.S. Pat. Nos. 4,918,992 and 4,019,388 where a glass support member is bonded and sealed to a metal housing by soldering. This sealing technique requires that the glass support member be coated with a solder wetable metal such as a mixture of titanium, platinum and gold. This process is complicated and expensive with an additional soldering operation necessary to complete the seal and in addition the seal does not function well at high pressure.

Due to the deficiencies of the prior art, a need presently exists for an improved type of pressure sensor that employs a proper selection of materials for mounting of a pressure sensitive silicon or other crystalline type diaphragm on a support element and for the hermetic mounting of the support element to seal the high pressure fluid to be measured from the reference pressure for operation at high temperatures and pressures and in corrosive environments while having a high degree of accuracy.

SUMMARY OF THE INVENTION

The present invention provides an improved method of physically mounting and hermetically sealing a diaphragm support element to minimize thermally induced stress thereby extending the operating temperature range of a pressure transducer. The materials selected for a diaphragm assembly, an intermediate support element, a main support element, a support collar and a fused sealing glass all have carefully selected coefficients of thermal expansion. The diaphragm assembly is anodically bonded to an intermediate support member which is anodically bonded to a silicon main support member. This assembly is then mounted to the transducer housing by way of a support collar and a sealing glass material. More specifically, the main support member is surrounded at its base by the support collar with a gap between the two. The gap is filled with a glass that is heated so that it flows and bonds to both the main support member and the support collar. The collar is then mounted to the transducer housing using a process such as welding which completes the hermetic seal between the pressure to be measured and a reference pressure. In an alternative configuration, the collar also functions as the transducer housing. In another alternative configuration, the intermediate support member is eliminated and the diaphragm assembly is mounted directly on the main support member.

Since the materials are carefully selected for matched coefficients of thermal expansion, the specific configuration and methods disclosed by the present invention provide for a very effective mounting system for a pressure sensitive diaphragm because thermally induced stresses are minimized permitting operation at high temperature with improved accuracy and durability.

The present invention also discloses a special process of preparing the glass sealing material so that upon fusing, the surface of the main support member and the support collar are both wetted by the glass thereby establishing a very effective durable hermetic seal and physical support between the two elements. Also, the glass is specially selected and prepared so that it's coefficient of thermal expansion is slightly greater than those of the main support member and less than the support collar so that a compressive type seal is maintained but not so great of an expansion rate that destructive stresses are generated. Furthermore, the glass, by using the special process, changes its mechanical characteristics when trapped water changes to vapor upon heating, forming microbubbles, thereby reducing thermally induced mechanical stress. Using the above techniques, a silicon diaphragm (or other crystalline diaphragm materials such as sapphire) can be mounted in a pressure transducer to operate over a wide range of temperatures with high accuracy and excellent durability.

An aspect of the present invention is to provide a support structure to a silicon or other type of crystalline diaphragm so that a transducer housing can surround the support member assembly to support the diaphragm element while minimizing stress at high temperatures.

Another aspect of the present invention is to provide an intermediate support member that allows a silicon or other crystalline diaphragm to be anodically bonded to the intermediate support member where the intermediate support member is then anodically bonded to a silicon main support member.

Another aspect of the present invention is to provide a process for sealing the main support member to a surrounding support ring using a specially prepared glass which is fused and bonds to both the support ring and the support member thereby establishing a hermetic seal between the pressure to be measured and the reference pressure.

The above and other aspects, as well as advantageous features of the invention, will become clear from the following description of the preferred embodiments taken in conjunction with the accompanying drawings.

DETAILED DESCRIPTION OF THE PREFERRED EMBODIMENT

Figure 1:
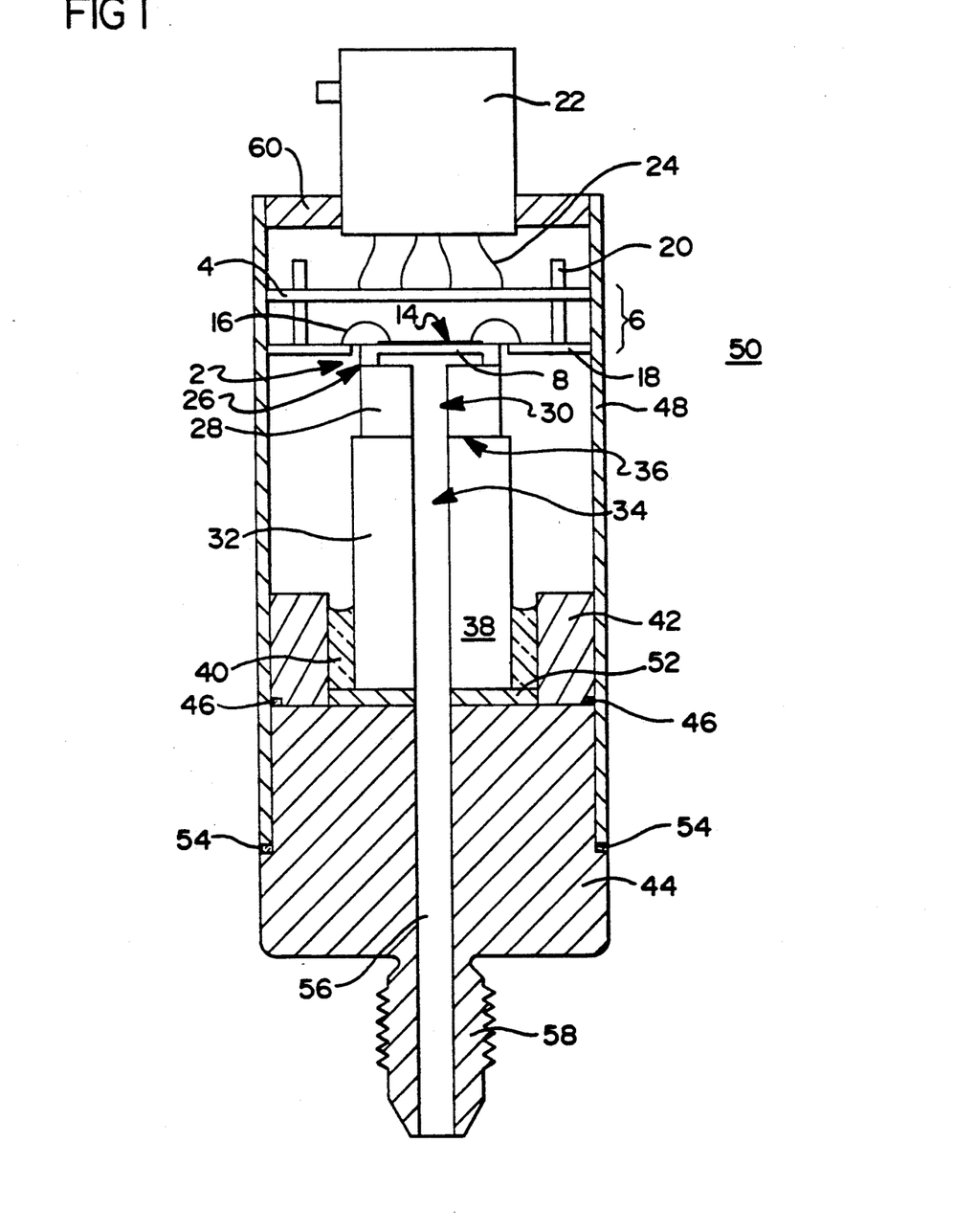
FIG. 1 is a cross-sectional view of a preferred embodiment of the pressure transducer of the present invention.

Referring to FIG. 1, a cross-section of the preferred embodiment of the pressure transducer of the present invention is shown. The transducer shown in FIG. 1 includes a pressure sensing assembly 2 connected to an optional electronics assembly 4. The pressure sensing assembly 2 provides the pressure measuring capability of the transducer shown in FIG. 1 while the electronics assembly 4 provides signal amplifying and conditioning circuitry. The pressure sensing assembly 2 and electronics assembly 4 together form a strain sensing package 6 which may be of an overall circular shape with the cross-section of FIG. 1 thus representing a section through the axis of the strain sensing package 3. Square, rectangular, hexagonal or alternate shaped packages may also be employed for either the pressure sensing assembly 2 or the electronics assembly 4.

Pressure sensing assembly 2 includes a diaphragm 8 formed of a crystalline silicon material which is supported by a thicker section 10 at the periphery of the diaphragm 8. A variety of alternate diaphragm materials can be used in place of silicon, an example being sapphire, and any reference to silicon is meant to encompass all types of diaphragm materials. The diaphragm 8 has a relatively thin cross-section so that the fluid being monitored causes the diaphragm 8 to flex thus inducing strain at the diaphragm 8 top surface. As will be described in more detail below, the diaphragm 8 has a thin layer of oxide 12 deposited as an electrical insulator and a thin film of strain sensitive elements 14 are formed or deposited on the oxide substantially symmetrically located about the center axis so that the flexing of diaphragm 8 causes the strain sensitive elements 14 to change electrical characteristics. Electrical signals from the strain sensitive elements 14 (such as piezoresistive or capacitor) are provided along wires 16 which are wire bonded to connection pads on a primary circuit board 18. The primary circuit board 18 surrounds the pressure sensing assembly 2 and has electrical connectors 20 which extend upwards and are electrically connected to the electronics assembly 4, the electrical output of which, is connected to connector 22 by way of electrical leads 24.

The thicker section 10 of the diaphragm 8 is integral to the diaphragm 8 and functions as a support along the diaphragm 8 periphery forming a diaphragm assembly 26. The thicker section 10 is bonded to an intermediate support member 28 which contains a passageway 30 so that pressure from the fluid to be monitored communicates with the underside of the diaphragm 8. The bond of thicker section 10 to the intermediate support member 28 may be provided by a number of techniques such as by using an epoxy adhesive, glass bond or an electrostatic bond known in the art as anodic bonding as described in U.S. Pat. No. 3,397,278 the disclosure of which is hereby incorporated by reference.

Using a similar bonding technique, the intermediate support member 28 is bonded to a main support member 32 which is formed from a crystalline or polycrystalline silicon material and contains a passageway 34 which is in substantial alignment with the passageway 30 of the intermediate support member 28 thereby establishing a conduit for the pressure to be sensed to reach the diaphragm 8. The function of the intermediate support member 28 is to allow anodic bonding to be used to mount the diaphragm assembly 26 when using a silicon main support member 32 since silicon cannot be anodically bonded directly to silicon. Main support member 32 can be fabricated from silicon rod or from machined silicon having a cylindrical shape or any one of a variety of shapes with a passageway 34 extending through the center. The material used for the main support member 32 has a coefficient of thermal expansion substanially equal to that of the diaphragm assembly 26. Prior to bonding, the face 21 to be joined of main support member 32 is optically polished to a fineness of one fringe per inch to facilitate anodic bonding between the elements 28 and 32.

The lower section 38 of the main support member 32 is physically supported and hermetically sealed by a sealing glass 40 which is fused to the surface of the main support member 32 and to a support collar 42 which surrounds the lower section 38 of main support member 32. The support collar 42 is welded to the periphery of the lower transducer member 44 as shown at 46. The main housing 48 which can be cylindrical in shape or take on a variety of other forms is made of a steel material and serves to enclose the working components of the pressure transducer 50.

Support collar 42 is formed of a precipitation hardened stainless steel of the alloy 15-5 but can also be fabricated from a variety of other materials such as 300 series stainless steel or Iconel Nickel-Base Superalloy or titanium alloy. The support collar 42 is formed in the shape of a tube with walls thin enough so that the material is deformed and stretches in the elastic region of the material stress-strain curve during high temperature excursions of the transducer thereby providing stress relief to the sealing glass 40 and main support member 32 to prevent cracking. A typical wall thickness for support collar 42 is 0.15 inch with a height of 0.48 inch and an outside diameter of 0.56 inch. The coefficient of thermal expansion of support collar 42 is greater than that of the main support member 32. The sealing glass 40 is selected so that its coefficient of thermal expansion is slightly greater than that of the main support member 32 such that at elevated temperature a compression type seal is created due to the greater expansion of the sealing glass 40 and support collar 42 as compared to the expansion of the main support member 32. The coefficient of thermal expansion of the intermediate support member 28 is substantially equal to that of the diaphragm assembly 26 and the main support member 32. To summarize, the coefficient of thermal expansion of the diaphragm assembly 26 is substantially equal to that of the intermediate support member 28 which is substantially equal to that of the main support member 32 where the coefficient of thermal expansion of the sealing glass 40 is slightly greater than that of the main support member 32 and the coefficient of thermal expansion of the support collar 42 is greater than that of the sealing glass 40.

If only low pressures are to be measured, then the coefficient of thermal expansion of the main support member 32 and the sealing glass 40 and the support collar 42 can all be substantially equal.

At the lower section 38 of main support member 32 a support washer 52 is located at a second end of the main support member 32 where support washer 52 is also fused to the sealing glass 40 and has an passageway extending therethrough in substantial alignment with the passageway 34 of the main support member 32.

The transducer main housing 48 extends downward to engage the lower transducer member 44 and is attached thereto using a welding process along its periphery at 46. The lower transducer member 44 has a passageway 56 extending from a pressure fitting 58 which is threaded to engage a pressure coupling from the pressure source to be measured. The passageway 56 is in substantial alignment with the passageway of support washer 52 thereby providing for communication of the pressure to be measured from the lower end of the transducer assembly through the lower transducer member 44 through the support washer 52 into the passageway 34 of the main support member 32 into the passageway 30 of the intermediate support member 28 and finally to the bottom surface of the diaphragm 8. Passageways 56, 34 and 30 form a high pressure chamber.

A top cover 60 continuously contacts the inner surface of the main housing 48 and the outside periphery of the connector 22 so that an environmental seal is effectuated.

Figure 2:
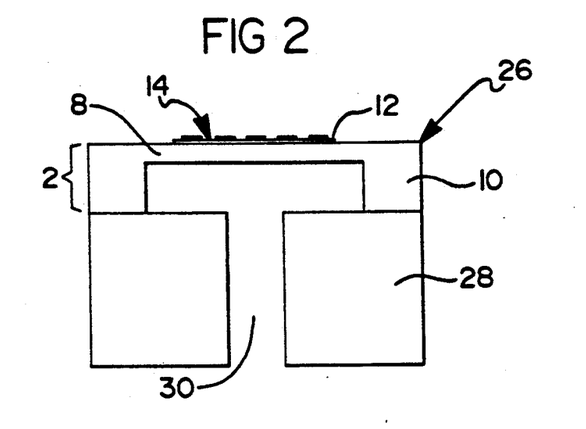
FIG. 2 is a cross-sectional view of the pressure sensing assembly and intermediate support member of the pressure transducer of FIG. 1.

Referring to FIG. 2, a cross-sectional view shows the diaphragm 8 as a thin deflectable diaphragm of single or a polycrystalline silicon preferably having a thickness of from 0.001 inches to 0.007 inches. A thin layer of electrically insulating oxide 12 is deposited on the top surface of the diaphragm 8 and a plurality of strain sensitive elements 14 are formed on the oxide 12 which can be piezoresistive elements epitaxially grown or deposited by methods such as chemical vacuum deposition or sputtering. The doping and epitaxial element deposition on the silicon diaphragm 8 is well known in the art as described in detail in U.S. Pat. Nos. 4,463,336; 4,080,830 and EP 0,390,619 the disclosures of which are incorporated herein by reference. The diaphragm 8 has a thicker section 10 at the periphery which is integral with the diaphragm 8 and functions as a support thereof. The bottom face of the thicker section 10 is optically polished to a fineness of approximately one fringe per inch in preparation for bonding preferably by an electrostatic process such as anodic bonding to the intermediate support member 28 which has an upper face that is prepared for bonding in a similar fashion. (Both the upper and lower faces of the intermediate support member 28 are polished in preparation for anodic bonding.) The intermediate support member 28 can take a variety of shapes but preferably matches the shape of the diaphragm assembly 26 which is a square shape as disclosed herein while the main support member 32 is cylindrical as disclosed but can be of a variety of shapes. Intermediate support member 28 is formed of a borosilicate glass such as 7740 Pyrex made by Corning Glass Works which is processed to form a wafer having a centrally located passageway 30 which communicates from the upper face to the lower face of the intermediate support member 28 thereby providing a path for passage of the fluid to be measured.

Figure 3:
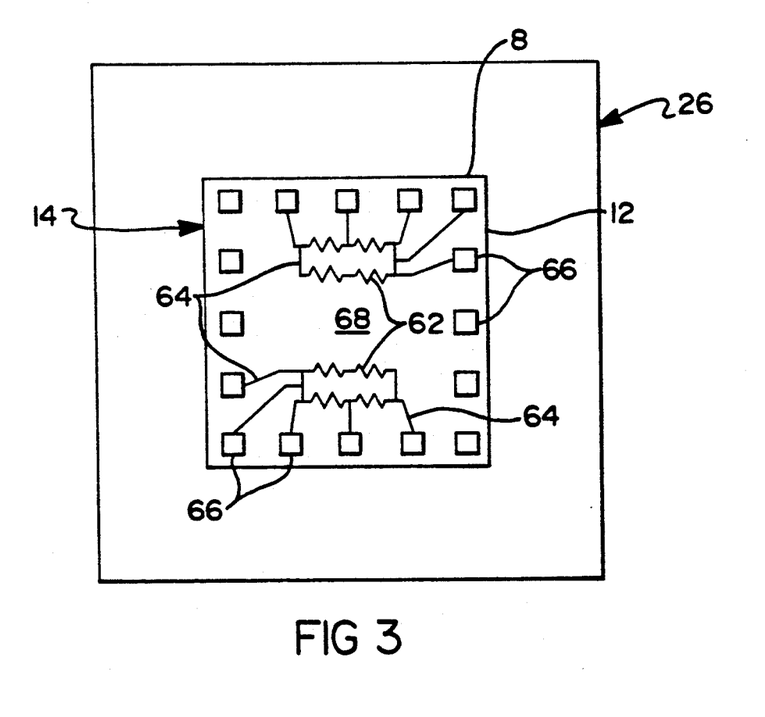
FIG. 3 is a top view of a preferred embodiment of the silicon diaphragm of FIG. 2 with piezoresistive elements formed thereon.

Common in the prior art is a method whereby solid state techniques involving the diffusion or deposition of a force sensitive arrangement of peizoresistors are used to fabricate a device which generates an electrical output proportional to pressure and/or deflection. FIG. 3 shows a top view of the silicon pressure sensing diaphragm having a pattern of piezoresistive strain gages 62 attached to the insulating oxide 12 on the top surface of the diaphragm 8 where the strain gages 62 are configured to form what is known in the art as a Wheatstone bridge circuit whose output leads 64 are connected to wird bonding pads 66 to form a strain measuring circuit 68 to measure strain of the diaphragm 8 upon introduction of a fluid pressure to be measured via passageway 30. The piezoresistors 62 are typically arranged so that two elements of the four are subject to tension and two are subjected to compression upon deflection of diaphragm 8. It is understood that other types of strain sensitive electrical devices could be used to generate an electrical signal in response to a strain in diaphragm 8 such as a capacitor. Some general fabrication techniques used in integrated circuit technology to deposit, diffuse or otherwise form the piezoresistive elements 62 on a silicon substrate are disclosed in U.S. Pat. Nos. 4,706,100; 4,295,115; 3,935,634; and 3,916,365, the disclosure of which are hereby incorporated by reference.

Figures 4, 5, 6:
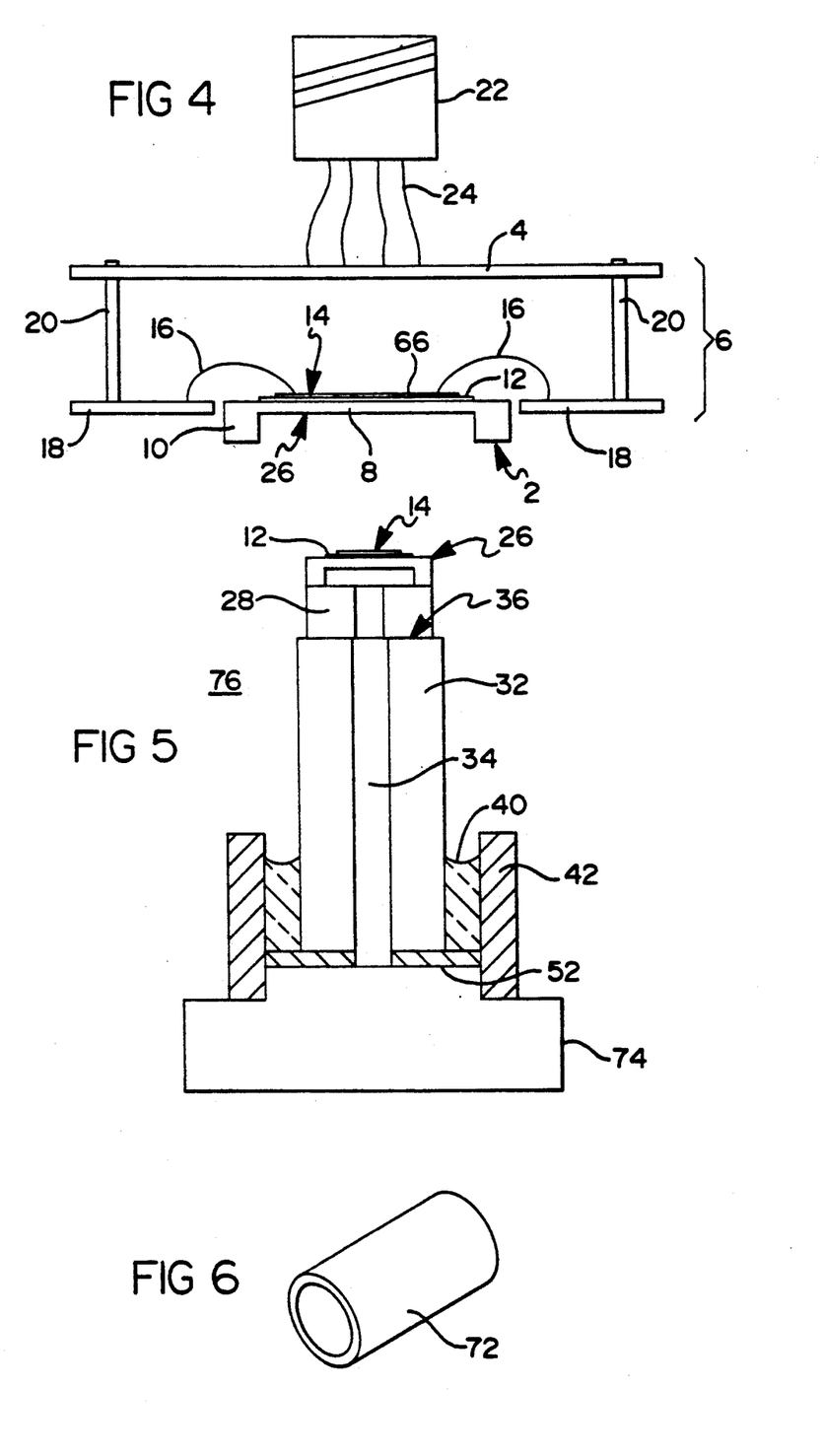
FIG. 4 is a cross-sectional view of the pressure sensing assembly and the signal electronics assembly.
FIG. 5 is a cross-sectional view of the main support element and the support collar hermetically sealed using fused glass.
FIG. 6 is a perspective view of the sealing glass preform.

Now referring to FIG. 4, a cross-section of the diaphragm assembly 26 is surrounded by a primary circuit board 18 where electrical connection is made from the strain measuring circuit 68 to the primary circuit board 18 via wires 16. The signal processing and amplification electronics assembly 4 includes an integrated circuit 70 which may include a relatively small power source providing a voltage across the piezoresistive elements in addition to measuring their change in resistivity and reaction to changes in the stress level of the diaphragm 8. Integrated circuit 70 may include an amplifier, compensation circuitry or other circuitry to enhance the signals provided from the pressure sensing assembly 2. For example, the compensation circuitry may receive an input from a temperature sensor and employ a curve fitting algorithm to enhance the accuracy of the transducer over a broad temperature range. U.S. Pat. No. 4,788,521, the disclosure of which is incorporated by reference, discloses a method of temperature compensation utilizing resistors with carefully selected temperature coefficients of resistivity. Similarly, the resistance values of the piezoresistive strain gages 62 can be trimmed after forming using techniques known in the art to a desired value. The amplified and/or compensated signal is provided from integrated circuit 70 along electrical leads 24 to connector 22. Connector 22 may be of a standardized type suitable for connection to external electrical equipment. Depending on the specific application, the electronics contained within integrated circuit 70 may alternatively be contained in the external electrical monitoring equipment. In this case, electronics assembly 4 may be eliminated and the electrical connectors 32 may be connected directly to the external connector 22. Wires 16 are joined from the wire bonding pads 66 of the strain measuring circuit 68 to the bonding pads of the primary circuit board 18 using common wire bonding techniques well known in the prior art.

FIG. 5 is a cross-section view of the main support member 32 joined to the support collar 42 by means of a sealing glass 40, the assembly being further contained with support washer 52. The sealing glass 40 is of a content similar to that made by Schott Glaswerke, a Composite Solder Glass, Part No. G017-339 which can be supplied as a glass preform 72 as shown in FIG. 6 or in bulk as a glass powder. The sealing glass 40 or preform 72 is prepared for installation by soaking in water or by placing in a humidity chamber. The hydration of the sealing glass 40 is important in both the bonding process and to form the proper structural characteristics needed to minimize induced strains during temperature excursions of the transducer. The water content controls the characteristics of the sealing glass 40 upon heating such as skin formation which controls the wetting and bonding of the sealing glass 40 to the main support member 32 and the support collar 42. Also, the water content in the sealing glass 40 creates microbubbles during the sealing heating process which alters the structural characteristics of the sealing glass 40 to minimize stresses transmitted to main support member 32.

Once the glass is prepared by hydration, assembly can commence. Assembly fixture 74 is used to provide the proper spacing between the support washer 52 and the support collar 42 which in turn sets the spacing for the main support member 32 and also contains the sealing glass 40 as it is heated and fused. Using the assembly fixture 74, the bottom face of the main support member 32 is maintained at a level higher than the bottom of the support collar 42, the objective being to properly distribute induced stresses in the main support element 32, the intermediate support element 28 and the diaphragm assembly 26 as the transducer undergoes temperature excursions.

During assembly, the support collar is placed upon the assembly fixture 74, support washer 52 is then placed inside the support collar 42 so that it lies on the top face of assembly fixture 74. If a glass preform is used, it is slipped on the lower end of the main support member 32 which is then inserted into the support collar 42 and held in position thereby. If a bulk powdered glass is used, the main support member 32 is placed into position inside the support collar 42 and centered therein, whereupon the powdered glass is packed into the space between the main support member 32 and the support collar 42. This whole support assembly 76 is then heated to a high temperature following the temperature versus time curve shown in FIG. 7 so that the sealing glass 40 is melted and flows wetting the surface of the main support member 32 and the inside surface of the support collar 42 and the top surface of support washer 52 bonding thereto and providing a hermetic seal therebetween.

Figure 7:
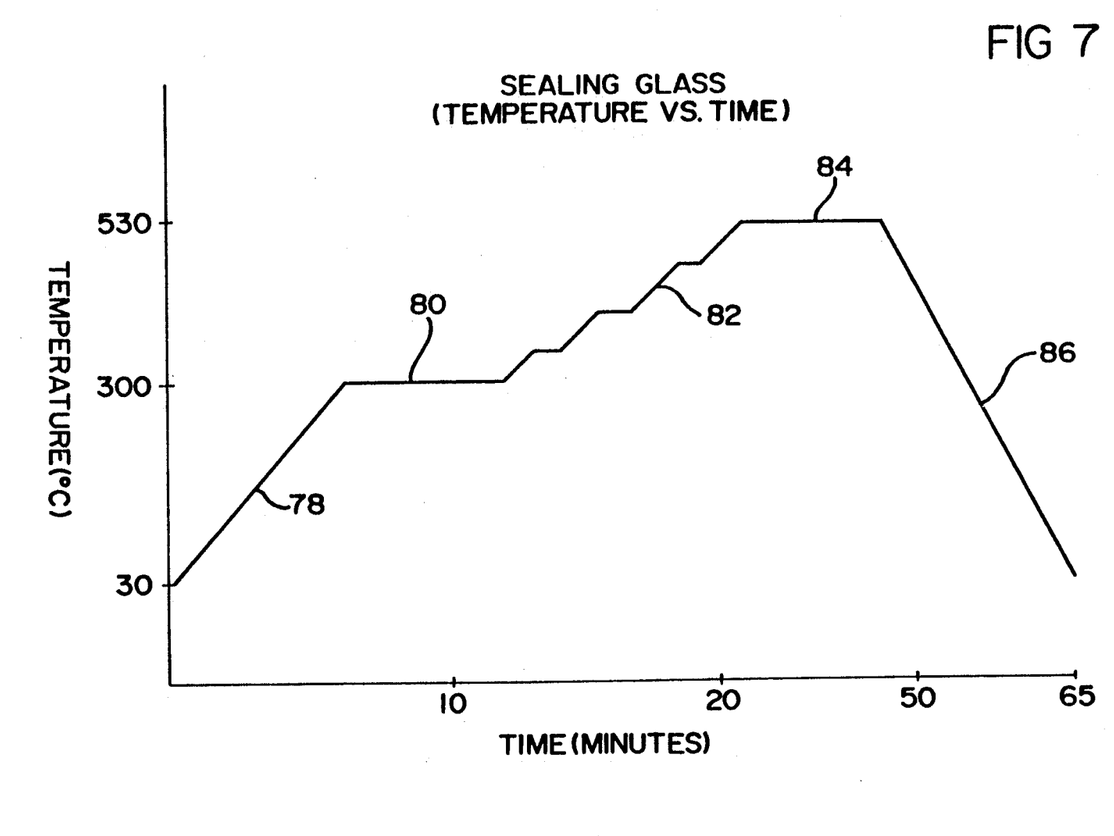
FIG. 7 is a temperature versus time diagram of the sealing glass fusing process.

Support assembly 76 is heated in an oven following a temperature versus time curve such as that shown in FIG. 7 where segments 78 and 80 of the temperature versus time curve is a general glass drying time at a temperature ramping from 30° C. to 300° C. over a time period of approximately five minutes and then held at 300° C. for an additional five minutes. The support assembly 76 is then heated to a maximum temperature of 530° C. following a stair-step type of temperature curve as shown in segment 80 of FIG. 7 where that event occupies a time period of approximately ten minutes. During this time, the water content in the sealing glass 40 undergoes a phase change and the vapor generated causes microbubbles to be formed in the sealing glass. The support assembly 76 is then held at a temperature of 530° C. for an additional time period of thirty minutes as indicated by line segment 84. During this time period, the sealing glass 40 melts and flows so as to bond to the main support member 32 and the support collar 42 and the support washer 52 thereby providing for a physical support and the hermetic seal of the three elements. The sealing glass 40 then sets up and recrystallizes during a cool down period that occupies a time of approximately fifteen minutes where the sealing glass 40 cools from a temperature of 530° C. to room temperature of approximately 30° C. as shown by line segment 86. It is understood that all temperatures and times disclosed herein are approximate and similar results are attainable using alternate parameters.

The support assembly 76 is then removed from the heating chamber and the assembly fixture 74 and installed on the transducer by welding the support collar 42 to the lower transducer member 44 at 46, thereby hermetically sealing the pressure to be measured from the reference pressure and providing physical support for the pressure sensing assembly 2 through the intermediate suppport member 28, the main support member 32, the sealing glass 40, the support collar 42 and lower transducer member 44. The assembly is completed with the welding of the lower transducer member 44 to the main housing 48 at 54, the installation of the electronics assembly 4 and the cover 60.

From the foregoing, it will be apparent that there has been provided an improved pressure transducer utilizing a strain sensitive element formed on a diaphragm. The diaphragm assembly 26 is anodically bonded to a Pyrex glass insulator intermediate support member 28 which is in turn anodically bonded to a main support member 32 providing for physical support and hermetic sealing with a sealing glass 40 and support collar 42 assuring maximum strength and providing stress iolation for operation up to 500° F. By matching the thermal expansion coefficients of the diaphragm assembly 26 with the intermediate support member 28, the main support member 32, and the support collar 42 the thermal stresses induced at various temperatures which cause measurement error or failure of the device are eliminated. The materials are carefully selected on the basis of their coefficient of thermal expansion for the diaphragm assembly 26, intermediate support member 28, main support member 32, sealing glass 40 and support collar 42. As an example, the following relative approximate coefficient of thermal expansion values have been selected to give the desired results: diaphragm assembly 26—$2.5 \times 10^{-6}$/°K.; intermediate support member 28—$2.5 \times 10^{-6}$/°K.; main support member 32—$2.5 \times 10^{-6}$/°K.; sealing glass 40—$4.5 \times 10^{-6}$/°K.; support collar 42—$11.3 \times 10^{-6}$/°K. Furthermore, by providing a construction wherein the sealing glass and other components function so that the main support member 32 is stressed in compression, any tendency to fracture when the transducer is subjected to high operating pressures or temperatures is greatly reduced. If only low pressure is to be measured, all of the elements 26, 28, 32, 40, and 42 can have substantially equal coefficients of thermal expansion.

Figure 8:
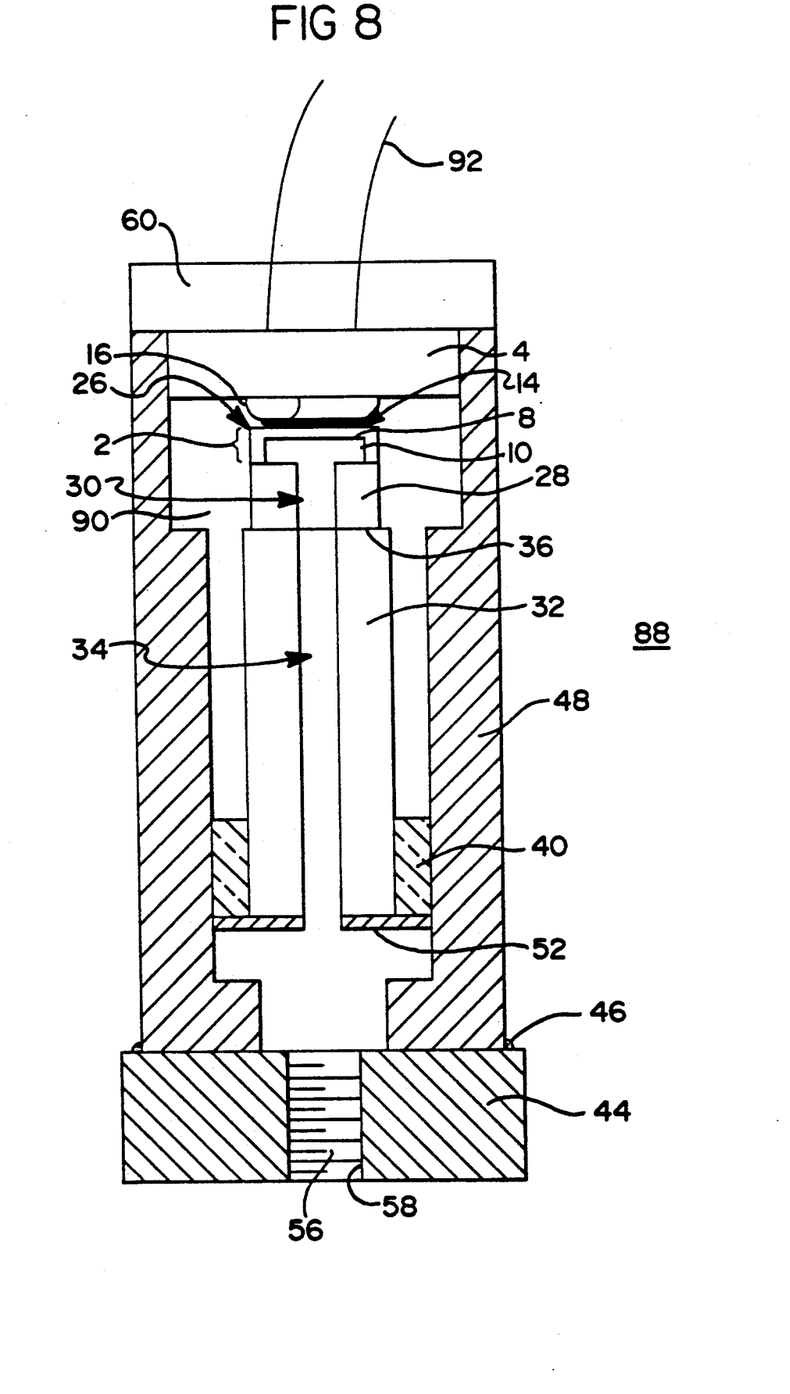
FIG. 8 is a cross-sectional view of a first alternative embodiment of the pressure transducer of the present invention.

Now referring to FIG. 8. a cross-sectional view of a first alternate embodiment of a pressure transducer 88 is shown where the main housing 48 functions as a support collar in that the sealing glass 40 bonds directly to the main housing 48 inside surface. Thus, the sealing glass 40 bonds the main support member 32, and the support washer 52, directly to the transducer main housing 48 providing a hermetic seal between the high pressure passageway 34 and the reference pressure contained in housing section 90. Main housing 48 forms a cavity which is sealed by a cover 60 and communicates with the pressure to be measured at the opposite end by a passageway 56 which is threaded to accept a pressure fitting 58 contained in the lower transducer member 44. Main housing 48 is joined to the lower transducer member 44 by welding as shown at 46. Also shown is the intermediate support member 28 which is fabricated from an insulating glass and anodically bonded to the main support member 32 at face 36 where the surface to be bonded of main support member 32 is optically polished to a fineness of one fringe per inch. Both the intermediate support member 28 and the main support member 32 have an axial passageway therethrough as shown at 30 and 34 respectively. A crystalline diaphragm assembly 26 is anodically bonded to the intermediate support member 28 at the thicker section 10 located at the periphery of the diaphragm 8. At least one strain sensitive element 14 is mounted on the diaphragm 8 and is electrically connected by way of wires 16 to an electronics assembly 4 which provides power conditioning and amplification of the signals from the strain sensitive elements 14 in response to changes in the force applied to diaphragm 8 due to the pressure to be measured as compared to the reference pressure. The amplified signals are then relayed to read-out instrumentation which is not shown but is commonly known in the art by way of wires 92.

Figure 9:
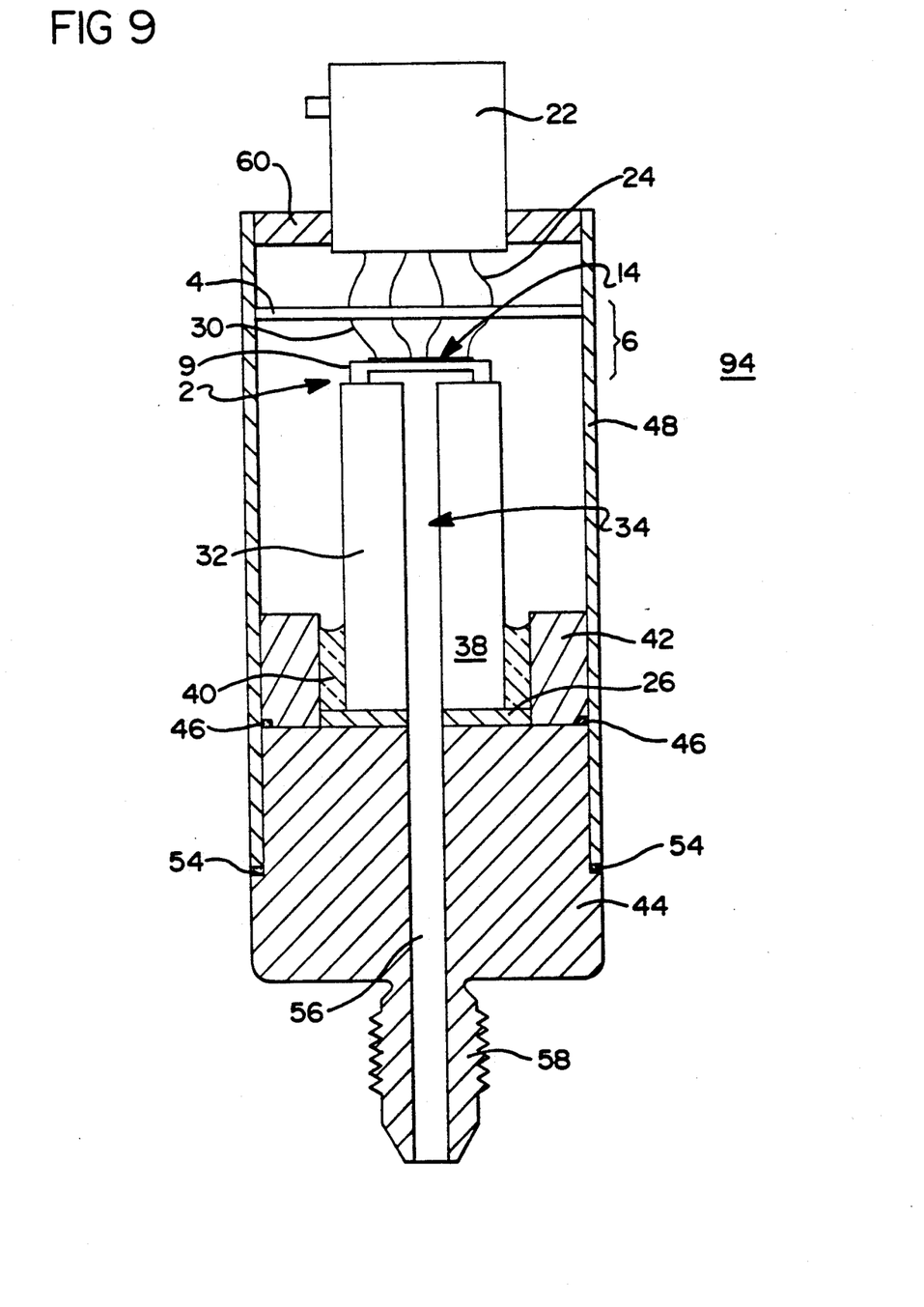
FIG. 9 is a cross-sectional view of a second alternative embodiment of the pressure transducer of the present invention.

FIG. 9 is a cross-sectional view of a second alternate embodiment of the present invention where the diaphragm assembly 26 has been bonded directly to the main support element 32. The purpose of the intermediate support element 28 in the prior embodiments was to allow the diaphragm assembly 26 to be anodically bonded while using a main support member 32 made out of silicon; the difficulty being that the silicon diaphragm assembly 26 cannot be anodically bonded directly to the silicon main support member 32. Assuming that a satisfactory bonding method can be implemented, the diaphragm assembly 26 (which can be made out of a variety of crystalline materials including silicon) can be mounted directly onto the main support member 32 which can be fabricated from a crystalline or polycrystalline silicon or an alternate material. In any case, the coefficient of thermal expansion of the various elements must be matched in accordance with the disclosure herein to assure that the internal stresses at elevated temperature do not result in failure of the diaphragm 8 or any of the support elements. The strain sensitive elements 14 are electrically connected to the electronics assembly 4 by way of connecting wires 16 where the electronics assembly 4 contains various electronic circuitry to condition and amplify the electrical signals generated from the strain sensitive elements 14. This electrical signal is then relayed to the connector 22 by way of electrical leads 24 for connection to external read-out instrumentation.

What is disclosed is a new device, apparatus and method of supporting a silicon (or other crystalline material) diaphragm for use in a pressure transducer where the support is mounted and the high pressure chamber therein is hermetically sealed from a reference pressure chamber for operation under harsh environmental conditions especially high temperatures and pressures.

It will be appreciated by those of ordinary skill in the art that many variations in the foregoing preferred embodiment are possible while remaining within the scope of the present invention. The present invention should thus not be considered limited to the preferred embodiments or the specific choices of materials, configurations, dimensions, applications or ranges of parameters employed therein.

What is claimed is:

1. A transducer for measuring a pressure comprising:
   a diaphragm having a relatively thin center section, said diaphragm being fixed in response to variations of a pressure to be measured, having disposed on one side of said center section a strain sensitive element;
   a main support member for said diaphragm having a first and second end and a passageway extending therethrough, said diaphragm bonded to said first end of said main support member so that said center section is in substantial alignment with said passageway of said main support member;
   support collar means surrounding a section of said main support member having a space between said main support member and said support collar means, and said support collar means extending to form a housing having walls and a base adapted to be connected to said pressure, said walls and said base enclosing said diaphragm and said main support; and
   a sealing glass which occupies said space between said support collar means and said main support member providing a hermetic seal therebetween.

2. The transducer of claim 1, wherein said main support member is formed of silicon.

3. The transducer of claim 1, wherein said strain sensitive element is a plurality of piezoresistive elements formed on an oxide layer on said center section of said diaphragm.

4. The transducer of claim 1, wherein said strain sensitive element is a capacitor bonded to said center section of said diaphragm.

5. The transducer of claim 1, wherein said diaphragm is supported by a thicker support portion at the periphery of said diaphragm where said thicker support portion is anodically bonded to said main support element.

6. The transducer of claim 1, wherein the coefficient of thermal expansion of said main support member is substantially equal to that of said diaphragm and the coefficient of thermal expansion of said sealing glass is greater than that of said main support member and the coefficient of thermal expansion of said support collar is greater than that of said sealing glass.

7. The transducer of claim 1, wherein the coefficient of thermal expansion of said diaphragm, said main support member, said sealing glass and said support collar are all substantially equal.

8. The transducer of claim 1, wherein said support collar is formed of a precipitation hardened steel.

9. The transducer of claim 1, wherein said support collar is formed of an Inconel Nickel-Base Superalloy.

10. The transducer of claim 1, wherein said support collar is formed of a stainless steel.

11. The transducer of claim 1, wherein said support collar is formed of a titanium alloy.

12. The transducer of claim 1, further comprising a support washer having a passageway therethrough in substantial alignment with said passageway of said main support member, said washer having an outer diameter slightly smaller than an inner diameter of said support collar, said washer having a face in contact with said second end of said main support member.

13. A transducer for measuring a pressure comprising:
   a lower transducer member adapted to be connected to a source of pressure to be measured, said lower transducer member having a passageway;
   a housing having walls and joined to said lower transducer member forming a cavity;
   a diaphragm having a relatively thin center section, said diaphragm being flexed in response to variations of a pressure to be measured, having disposed on one side of said center section a strain sensitive element;
   an intermediate support member for said diaphragm formed of an electrically insulating glass, said intermediate support member having a first end and a second end with a passageway extending therethrough, said diaphragm bonded to the first end of said intermediate support member so that said active area is in substantial alignment with said passageway;
   a main support member for said intermediate support member having a first and a second end with a passageway extending therethrough, said second end of said intermediate support member bonded to said first end of said main support member so that said passageway of said main support member is in substantial alignment with said passageway of said intermediate support member;
   a support collar surrounding said main support member and attached to said lower transducer member inside said cavity and having a void between said support collar and said main support member; and
   a sealing glass which occupies said void between said support collar and said main support providing a hermetic seal therebetween.

14. The transducer of claim 13, wherein said intermediate support member is formed of a borosilicate glass.

15. The transducer of claim 13, wherein said intermediate support member is formed of a borosilicate glass known as 7740 Pyrex.

16. The transducer of claim 13, wherein said main support member is formed of silicon.

17. The transducer of claim 13, wherein said sealing glass is formed of a hydrated lead borate solder glass.

18. The transducer of claim 13, wherein said sealing glass is hydrated and then is heated in substantial accordance with a specified temperature and time history.

19. The transducer of claim 13, wherein the coefficient of thermal expansion of said main support member is substantially equal to that of said diaphragm and the coefficient of thermal expansion of said sealing glass is greater than that of said main support member and the coefficient of thermal expansion of said support collar is greater than that of said sealing glass.

20. The transducer of claim 13, wherein the coefficient of thermal expansion of said diaphragm, said main support member, said sealing glass and said support collar are all substantially equal.

21. The transducer of claim 13, wherein said diaphragm is formed of silicon.

22. The transducer of claim 13, wherein said diaphragm is formed of crystalline silicon having a relatively thin center section, said diaphragm being flexed in response to variations of said pressure, having disposed on one side of an active area thereof a thin layer of oxide having formed thereon at least one strain sensitive element with a thicker support portion at the periphery of said diaphragm.

23. The transducer of claim 22, wherein said strain sensitive element is a plurality of piezoresistors arranged in a configuration known as a Wheatstone bridge.

24. The transducer of claim 13, wherein said diaphragm is anodically bonded to said intermediate support member.

25. The transducer of claim 13, wherein said intermediate member is anodically bonded to said main support member.

26. A transducer for measuring a pressure comprising:
a lower transducer member adapted to be connected to a source of pressure to be measured, said base having a passageway;
a main housing having walls and attached to said lower transducer member forming a cavity;
a crystalline diaphragm having a relatively thin center section, said diaphragm being flexed in response to variations of said pressure, having disposed on one side of an active area thereof at least one strain sensitive element with a thicker support portion at the periphery of said diaphragm;
an intermediate support member for said diaphragm formed of a borosilicate glass, said intermediate support member having a first end and a second end with a passageway extending therethrough, said diaphragm thicker support portion anodically bonded to the first end of said intermediate support member so that said active area is in substantial alignment with said passageway said intermediate support member having a coefficient of thermal expansion substantially equal to said diaphragm;
a main support member for said intermediate support member formed of a crystalline silicon having a first end and a second end and a passageway extending therethrough, said second end of said intermediate support member anodically bonded to said passageway of said main support member so that said passageway of said main support member so that said passageway of said main support member is in substantial alignment with said passageway of said intermediate support member said main support member having a coefficient of thermal expansion substantially equal to said intermediate support member;
a support collar formed of a precipitation hardened steel surrounding a section of said main support member and attached to said lower transducer member and having a void between said support collar and said main support member said support collar having a coefficient of thermal expansion approximately four times as great as that of said main support member;
a support washer having a passageway therethrough in substantial alignment with said passageway of said main support member located at said second end of said main support member, a peripheral edge of said support washer contacting said support collar;
a sealing glass which occupies said void between said support collar and said main support member providing a hermetic seal therebetween said sealing glass having a coefficient of thermal expansion of 0% to 50% greater than that of said main support member;
an electrical signal conditioning means mounted in said housing and electrically connected to said strain sensitive element; and
an electrical connector mounted to said housing at an end opposite to said lower transducer member and electrically connected to said electrical signal conditioning means.

27. The transducer of claim 26, wherein said crystalline diaphragm comprises:
a first layer formed of a single crystal silicon having a central hollow and a closed top surface, said top surface being relatively thin and surrounded by a thicker side surface, said top surface defining a force collecting diaphragm;
a second layer formed of a relatively thin cross section of oxide material deposited on said top surface that covers said force collecting diaphragm; and
at least one strain sensitive element residing on said second layer of oxide material.

28. The transducer of claim 26, wherein said strain sensitive element consists of a plurality of piezoresistive strain gages arranged to form a Wheatstone bridge.

29. The transducer of claim 26, wherein said intermediate support member is formed of 7740 Pyrex glass.

30. The transducer of claim 26, wherein said support collar is formed of a precipitation hardened steel.

31. The transducer of claim 26, wherein said support collar is formed of a stainless steel.

32. The transducer of claim 26, wherein said support collar is formed of a titanium alloy.

* * * * *